US007171807B2

(12) United States Patent
Fox et al.

(10) Patent No.: US 7,171,807 B2
(45) Date of Patent: Feb. 6, 2007

(54) OIL CIRCUITRY FOR TWO-STAGE TELESCOPING TRANSMISSION JACK

(75) Inventors: Robert Fox, Torrence, CA (US); Kun-Shan Hsu, Chia-I (TW)

(73) Assignee: Norco Industries, Inc., Compton, CA (US)

( * ) Notice: Subject to any disclaimer, the term of this patent is extended or adjusted under 35 U.S.C. 154(b) by 79 days.

(21) Appl. No.: 10/906,211

(22) Filed: Feb. 9, 2005

(65) Prior Publication Data

US 2005/0172793 A1 Aug. 11, 2005

Related U.S. Application Data

(60) Provisional application No. 60/542,937, filed on Feb. 9, 2004.

(51) Int. Cl.
*F16B 31/02* (2006.01)
*F01B 7/20* (2006.01)
*B21J 9/18* (2006.01)

(52) U.S. Cl. ............................. 60/478; 92/53; 91/457; 254/2 B

(58) Field of Classification Search .................. 60/478; 92/51, 52, 53; 91/457; 254/2 R, 2 B, DIG. 16, 254/93 R
See application file for complete search history.

(56) References Cited

U.S. PATENT DOCUMENTS 2,420,910 A * 5/1947 Richards .................. 254/93 H
3,329,403 A 7/1967 Juds
3,687,013 A 8/1972 Haller
3,956,970 A 5/1976 Kupiek et al.
4,087,210 A * 5/1978 Suechting ................ 91/341 A
4,437,309 A 3/1984 Suzuki et al.
4,471,944 A 9/1984 Leray et al.
4,516,468 A 5/1985 Sheriff
4,523,743 A 6/1985 Wang
4,598,898 A 7/1986 Hsu et al.
4,706,937 A * 11/1987 Chung ...................... 254/93 H
4,746,097 A * 5/1988 Chung et al. ............ 254/93 H
4,765,225 A 8/1988 Birchard
4,798,125 A 1/1989 Chang et al.
4,842,252 A 6/1989 McMahan
4,852,464 A 8/1989 Bartmann et al.
5,284,321 A 2/1994 Meyer
5,388,808 A * 2/1995 Laitre ......................... 254/35
5,390,586 A 2/1995 Jones
5,400,695 A * 3/1995 Walker .......................... 92/51
5,406,880 A 4/1995 Haller
5,421,554 A 6/1995 Hsu
5,727,390 A 3/1998 Hartle
5,775,672 A 7/1998 Hsu
5,975,496 A 11/1999 Hong et al.
5,983,778 A 11/1999 Dawson
6,318,401 B1 11/2001 Cheng
6,378,843 B1 4/2002 Hong
6,439,103 B1 8/2002 Miller
2004/0047747 A1 3/2004 Hsu

* cited by examiner

*Primary Examiner*—Igor Kershteyn
(74) *Attorney, Agent, or Firm*—Hahn Loeser & Parks LLP; Michael H. Minns

(57) ABSTRACT

A multi-stage telescoping transmission jack with a high flow, lower pressure air-over-oil pump.

27 Claims, 8 Drawing Sheets

OIL CIRCUITRY FOR TWO-STAGE TELESCOPING TRANSMISSION JACK

This application claims priority from provisional application Ser. No. 60/542,937, filed Feb. 9, 2004, the disclosure of which is hereby incorporated by reference.

BACKGROUND OF THE INVENTION

This invention relates generally to telescopic lifting jacks and more particularly to two-stage telescopic transmission jacks.

Most automotive transmission jacks used in under hoist applications are designed with telescopic rams. Telescopic rams are desirable because the transmission on the jack will be positioned at an almost work table height when the rams are not extended. Telescopic rams enable the jack to have a work table height and then extend to a maximum height of seventy-two plus inches. The maximum work height (seventy-two plus inches) provides enough clearance under the vehicle as it is suspended by an in-ground or above-ground lift for a mechanic to stand erect and make under car repairs.

Telescopic transmission jacks are designed with different types of pumps. The more expensive pumps provide faster and easier raising of the telescopic rams. The least expensive pump is designed with a single pump piston, which is activated either manually or by foot. Other pumps are activated the same way but are linked with dual pump pistons for faster rising of the rams. More expensive pumps are designed with an air activated primary ram that locks into position at its maximum height so the secondary hydraulic pump piston can be manually activated the rest of the way. Although the more expensive pumps are fast rising, there are some drawbacks to their designs. A ram activated by compressed air must have two valves. One valve controls the lifting of the primary ram with the load and one valve controls the lowering of the primary ram with the load. The primary ram can bounce or shoot up under load, if the valves are not adjusted properly, or the air cylinder is not properly lubricated. Since transmissions vary in size and weight, it is difficult to keep one valve adjustment that will satisfy all conditions. This type of pump is used with much success by mechanics who are familiar with the idiosyncrasies of the design. Other mechanics feel unsure and lack confidence in the operation of the jack.

The foregoing illustrates limitations known to exist in present two-stage transmission lifting jacks. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing in combination: a multi-stage telescoping transmission jack; and an air-over-oil pump supplying pressurized hydraulic fluid to the multi-stage telescoping transmission jack.

In an alternate aspect of the present invention, this is accomplished by providing a multi-stage telescoping transmission jack comprising: a primary cylinder; a linearly movable primary ram within the primary cylinder, at least a portion of the primary ram being a hollow cylinder; a primary oil cavity between the primary cylinder and the primary ram; a linearly movable secondary ram within the primary ram; a secondary oil cavity formed between the secondary ram and the primary ram; and means for bleeding oil from at least one of the primary oil cavity and the secondary oil cavity.

In another aspect of the present invention, this is accomplished by providing a multi-stage telescoping transmission jack comprising: a primary cylinder; a linearly movable primary ram within the primary cylinder, at least a portion of the primary ram being a hollow cylinder, the primary ram having a primary ram bearing at a lower end thereof, the primary ram bearing having an interior through passage; a primary oil cavity between the primary cylinder and the primary ram, the primary ram bearing having a bleed passage extending between the primary oil cavity and the primary ram bearing interior through passage; a linearly movable secondary ram within the primary ram, a lower tip portion of the secondary ram extending into the primary ram bearing interior through passage when the secondary ram is in a lowered position, there being an oil passage between the secondary ram lower tip portion and the primary ram bearing interior through passage; and a secondary oil cavity formed between the secondary ram and the primary ram, there being a bleed passage through the secondary ram to an undersurface of the secondary ram.

In another aspect of the present invention, this is accomplished by providing a method for lifting a transmission comprising: providing a multi-stage transmission jack having a primary cylinder; a linearly movable primary ram within the primary cylinder; a primary oil cavity between the primary cylinder and the primary ram; a linearly movable secondary ram within the primary ram; a secondary oil cavity formed between the secondary ram and the primary ram; and, a hydraulic fluid reservoir containing a quantity of hydraulic fluid; supplying the hydraulic fluid to a pump; operating the pump to increase the pressure of the hydraulic fluid to an operating pressure; supplying the operating pressure hydraulic fluid to the underside of the primary cylinder; porting hydraulic fluid from the primary cylinder cavity to an underside of the secondary ram; and porting hydraulic fluid from the secondary cylinder cavity to the underside of the secondary ram.

In an alternate aspect of the present invention, this is accomplished by providing a method for bleeding air from a multi-stage transmission jack, the method comprising the steps of: providing a multi-stage transmission jack having a primary cylinder; a linearly movable primary ram within the primary cylinder; a primary oil cavity between the primary cylinder and the primary ram; a linearly movable secondary ram within the primary ram; and, a secondary oil cavity formed between the secondary ram and the primary ram; supplying pressurized hydraulic fluid to an underside of the primary ram; porting any air contained within the primary oil cavity to an underside of the secondary ram; supplying pressurized hydraulic fluid to the underside of the secondary ram; porting any air contained beneath the underside of the secondary ram to the secondary oil cavity; continuing to supply pressurized hydraulic fluid to the underside of the primary ram and the underside of the secondary ram until the primary ram and the secondary ram have moved to an upper limit of travel; and while continuing to supply pressurized hydraulic fluid to the underside of the primary ram and the underside of the secondary ram, bleeding any air contained within the secondary oil cavity.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

The new designed jack was first assembled together using an SPX® air-over-hydraulic (oil) foot pump by SPX corporation. An air-over-hydraulic foot pump is constructed in such a way that a much larger air cylinder activates a smaller hydraulic pump piston in order to produce as much as 10,000 p.s.i. hydraulic pressure. In essence, a large area air cylinder under 100 p.s.i. of air pressure activated against a smaller diameter hydraulic piston can produce 10,000 p.s.i. hydraulic pressure. This type of pump has been used with larger capacity, single ram, under hoist transmission jacks that handle heavy duty truck transmissions. Testing showed that dual stage telescopic rams pulsated when activated by the air over hydraulic foot pump and this pulsation is not acceptable for raising transmissions. Transmissions must be stable and secure when supported by a transmission jack. A second problem was the slow activation of the rams. A third problem was not being able to easily remove the air trapped in the telescopic ram cylinders. The third problem manifested itself in the forms of: the secondary ram not extending all the way; a spongy and bouncing feeling in the rams; and, a ram shooting up as opposed to a smooth consistent rise. It appears that an SPX style pump operates very well with a large diameter single ram but pulsates smaller diameter multi-stage telescopic rams. Since our application with telescopic rams only requires 3,500 p.s.i. of hydraulic pressure, a pump was modified sacrificing pressure for increased hydraulic flow. The modified pump produced 6,500 less p.s.i. with the hydraulic flow rate increased to a point where the ram speed of ascent was acceptable. This modification only corrected problem number two. The rams would still pulsate excessively.

In one aspect, the invention is the combination of a high flow, lower pressure air-over-oil pump with a multi-stage telescoping transmission jack. Preferably, the oil pressure is less than 3,500 p.s.i. The combined air-over-oil pump and two-stage telescoping transmission jack has a capacity of at least 1000 lbs.

Figure 1:
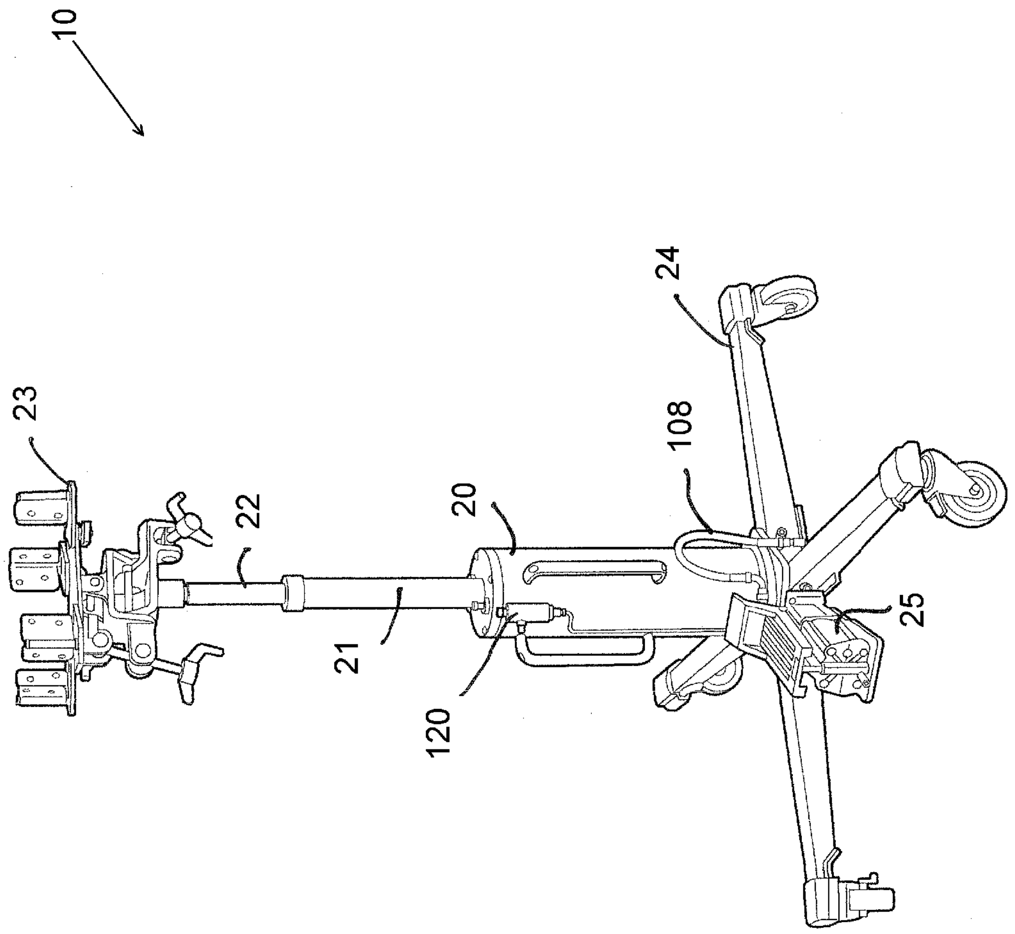
FIG. 1 is a perspective view of a two-stage telescopic transmission jack according to the present invention

FIG. 1 shows a two-stage telescopic transmission lifting jack 10 using pressurized hydraulic fluid supplied by air-over-oil foot pump 25. Lifting jack 10 includes a two-stage cylinder 20 with a first stage 21 and a second stage 22. An adapter or saddle 23 is provided at the top of the second stage 22 to hold and secure a transmission to the lifting jack 10. A wheeled base 24 is provided at the bottom of the two-stage cylinder 20 to facilitate movement of the lifting jack 10.

Figure 2:
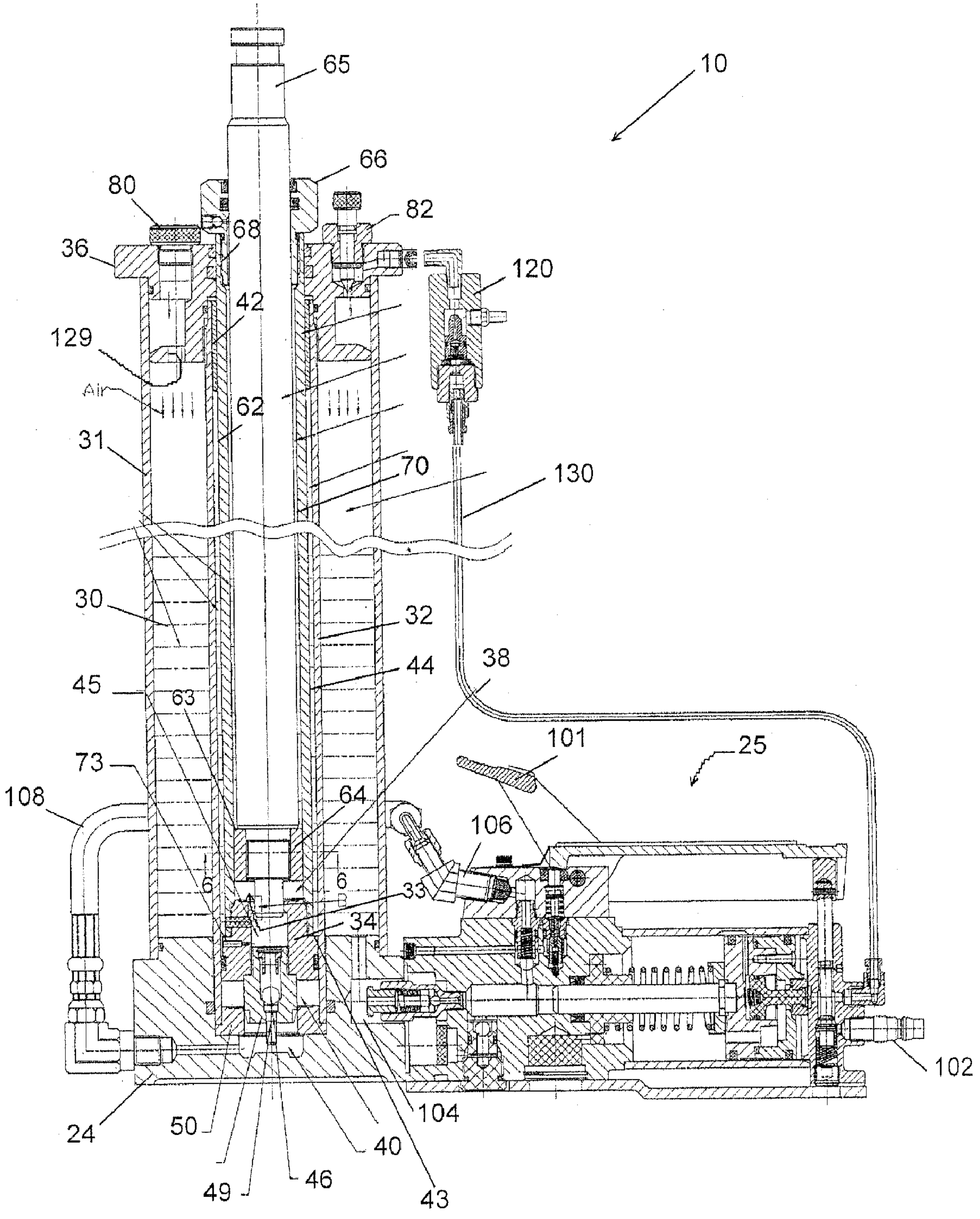
FIG. 2 is a cross-sectional view of the two-stage telescopic transmission jack shown in FIG. 1.

A cross-section of the two-stage cylinder 20 and pump 25 is shown in FIG. 2. Typically, base 24 includes a manifold that connects the oil inlet plenum 40 to foot pump 25 and an oil reservoir 30. The first stage cylinder 21 (See FIG. 1) comprises a moveable primary ram 62 inside primary cylinder 32. The oil reservoir 30 is formed between the primary cylinder 32 and an outer casing 31. The lower portion of the first stage cylinder 21 is positioned within the outer support casing 31. A primary cylinder nut 36 seals the primary ram 62 within the primary cylinder 32. A fill inlet plug 80 is provided in the primary cylinder nut 36 for adding oil to the oil reservoir. Various seals such as a wipers, pressure seals and O-rings are used to seal the first stage cylinder 21 and the second stage cylinder 22 (See FIG. 1). The second stage cylinder 22 fits within the hollow cylindrical primary ram 62, which also acts as the secondary cylinder.

A primary ram bearing 34 is fastened to the lower end of the primary ram 62. At least one O-ring or other type of seal is provided to seal the moveable primary ram bearing 34 to the primary cylinder 32. In general, to operate the first stage cylinder 21, a foot pedal 101 is operated to supply compressed air via air inlet 102 to the air-over-oil pump 25. In addition, compressed air is supplied to the oil reservoir 30 via air passageway 130 through air control valve 120 to pressurize the oil reservoir 30 in order to supply pressurized oil to the pump suction 104. This air enters the primary cylinder nut 36 and is discharged into the oil reservoir 30 via an air passageway 129 through a flange in the primary cylinder nut 36.

Pressurized hydraulic fluid or oil is supplied from the pump discharge 106 through an oil conduit 108 to the inlet plenum 40 below the primary ram bearing 34. The pressurized hydraulic fluid causes the primary ram bearing 34 and primary ram 62 to rise upward. A primary stop 42 is provided in the primary cylinder cavity 44, between the primary cylinder 32 and the primary ram 62, to limit upward movement of the primary ram 62. A shoulder 43 on the primary ram bearing 34 will contact the primary stop 42 at the upper limit of the movement of the primary ram 62.

Figure 2A:
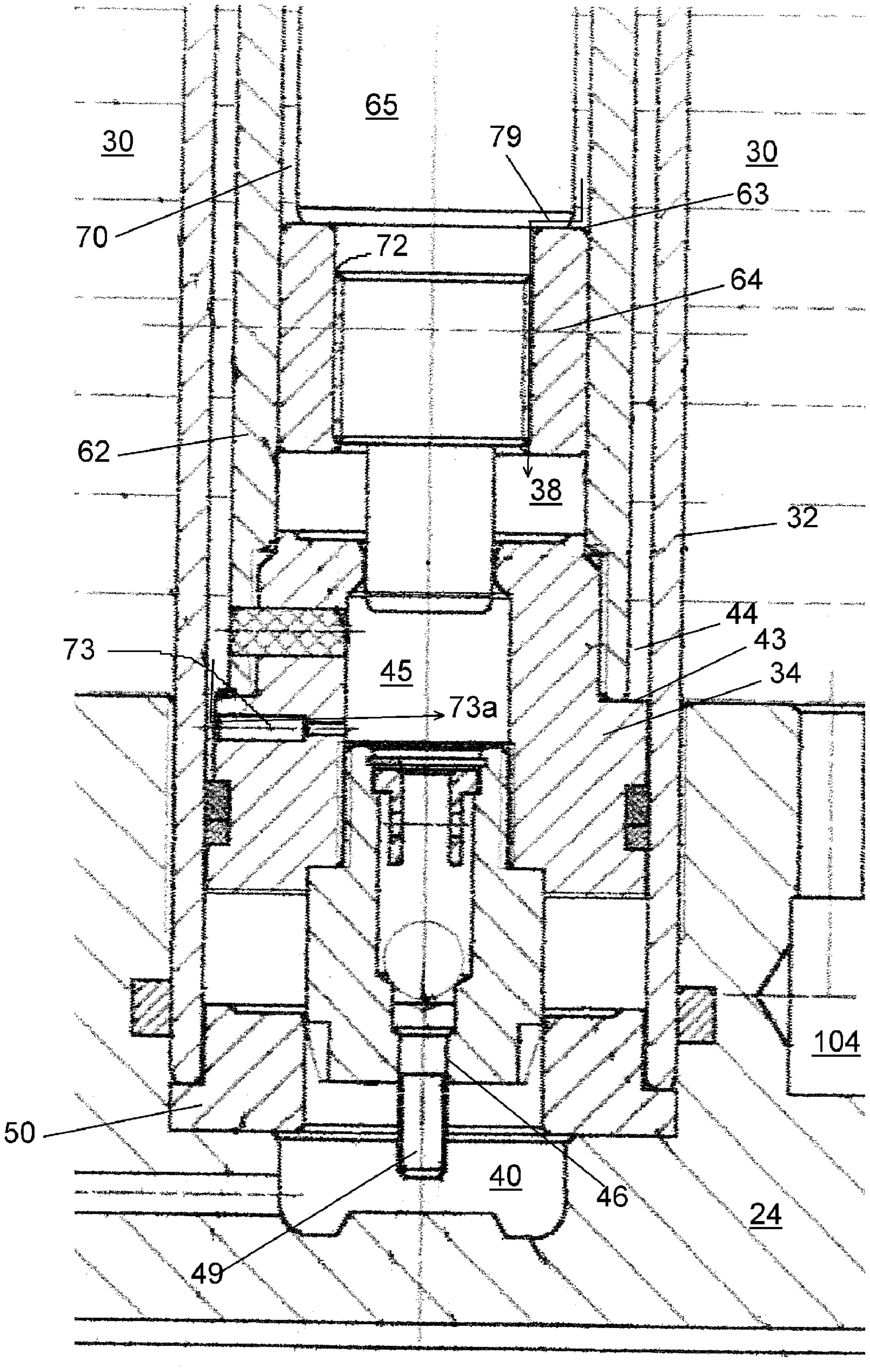
FIG. 2A is an enlarged cross-sectional view of a portion of the two-stage cylinder shown in FIG. 2.
Figure 3:
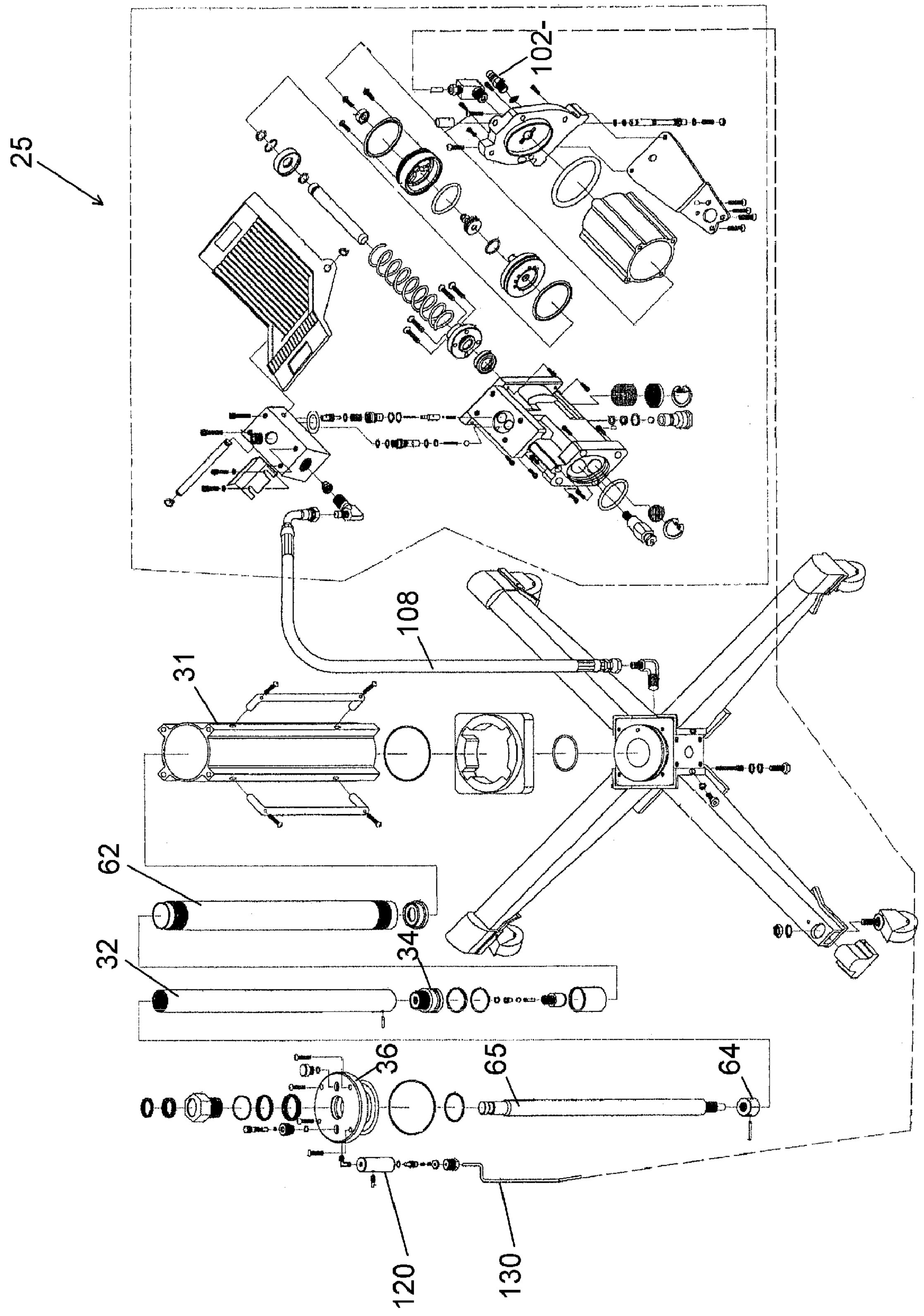
FIG. 3 is an exploded perspective view of the two-stage telescopic transmission jack shown in FIG. 1.

The hydraulic pressure applied to the bottom of the primary ram bearing 34 causes the primary ram 62 to raise upwards. The shoulder 43 of the primary ram bearing 34 will cause oil in the primary cylinder cavity 44 (formed between the primary ram 62 and the primary cylinder 32) to become pressurized. A primary ram bearing bleed channel 73 allows this pressurized oil to flow from the primary cylinder cavity 44 into primary ram bearing bore 45 and adjacent primary ram oil cavity 38. (See arrow 33 in FIG. 2) Alternatively, this pressurized oil can be routed through or around the primary ram bearing 34 to the inlet plenum 40, such as through grooves in the outer surface of the primary ram bearing 34. Preferably, the pressurized oil from the primary cylinder cavity 44 is ported to the upper side of the primary ram bearing 34. The primary ram bearing bleed channel 73 allows pressurized oil to flow out of the primary cylinder cavity 44 (as shown by arrow 73*a* in FIG. 2A) and reduces or eliminates any pulsations caused by the pressurization of the primary cylinder cavity 44. Additionally, the supply of the bypassed pressurized oil to the upper side of the primary ram bearing 34 causes the secondary ram 65 to lift relative to the primary ram 62 when the primary ram 62 is being raised.

Some prior art two-stage telescopic cylinders also lift the secondary ram relative to the primary ram while the primary ram is being lifted. Typically, this is an unintended result caused by air in the primary oil cavity being forced into the primary ram oil cavity beneath the secondary ram. This is not a true lift of the secondary ram using pressurized oil. This can be an inconvenient and loss of time situation once increased load is applied to the secondary ram.

Because of the primary ram bearing bleed channel 73, the relative lifting of the secondary ram 65 while the primary ram 62 is lifting is a true lift of the secondary ram 65. When the raising of the two stage jack 10 is completed, the secondary ram 65 is ready to accept load without any hesitation or spongy effect normally associated with an air bound hydraulic system.

A check valve 46 with an internal check ball is positioned within the through bore 45 in primary ram bearing 34. The force of the pressurized oil from the primary cylinder cavity 44 in the primary ram oil cavity 38 (on the upper side of the primary ram bearing 34) holds check valve 46 closed until the primary ram bearing shoulder 43 contacts the primary stop 42. Continued application of hydraulic fluid by pump 25 will increase oil pressure in inlet plenum 40 and lift the check ball out of contact with a valve seat in the check valve 46. Pressurized oil will flow into primary ram oil cavity 38 inside of the hollow cylindrical primary ram 62 and apply oil pressure to the lower surface of the secondary ram bearing 64, causing the secondary ram bearing and the secondary ram 65 to rise. If necessary, check valve 46 could include a spring to seat the check ball against the valve seat.

Second stage cylinder 22 comprises a generally solid secondary ram 65 attached to the secondary ram bearing 64, both positioned within the primary ram or secondary cylinder 62. The transmission saddle 23 is attached to the upper end of the secondary ram 65. Secondary cylinder nut 66 seals the upper end of the second stage cylinder 22. A shoulder 63 on the upper end of the secondary ram bearing 64 acts against a secondary stop 68 to limit upward movement of the secondary ram 65.

Figure 7:
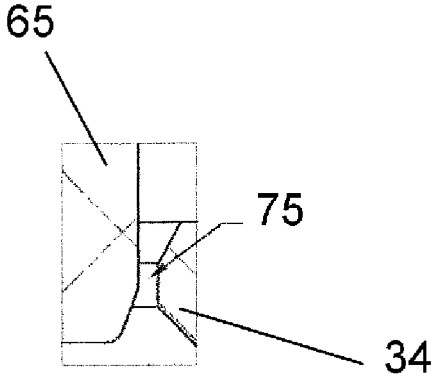
FIG. 7 is an enlarged cross-sectional view showing flow passages between the primary ram bearing and the secondary ram.

Preferably, primary ram bearing flow bypass channels 75 (see FIG. 7) are provided between the primary ram bearing 34 and the lower end or tip of the secondary ram 65. These bypass channels 75 permit the pressurized oil in the primary ram bearing bore 45 to be applied across the entire lower surfaces of the secondary ram 65 while the tip of the secondary ram 65 is within the primary ram bearing bore 45. (See arrow 33 in FIG. 2)

Figure 6:
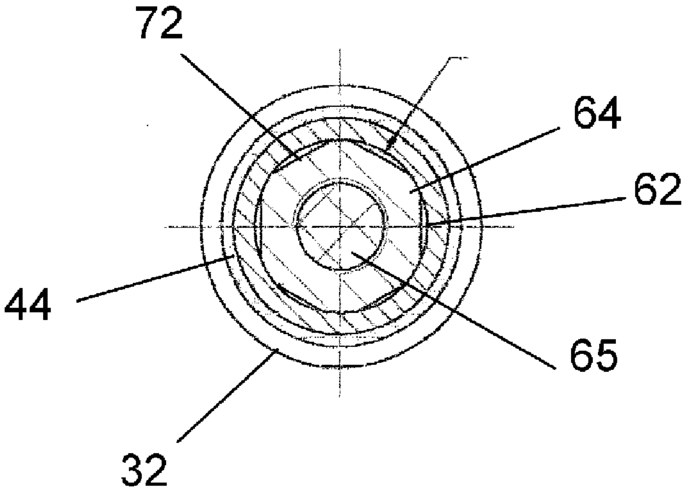
FIG. 6 is an enlarged cross-sectional view of the secondary ram bearing.

The primary ram 62 also acts as the secondary cylinder. An oil filled secondary cylinder cavity 70 is formed between the secondary cylinder 62 and the secondary ram 65. As the secondary ram 65 rises relative to the primary ram or secondary cylinder 62, oil in the secondary cylinder cavity 70 is pressurized. As shown in FIG. 6, the secondary cylinder ram bearing 64, surrounding the lower end of the secondary ram 65, has a hexagonal shape. The flat surfaces of this hexagonal shape form secondary bearing bypass channels 72 between the secondary cylinder ram bearing 64 and the circular secondary ram tip 62. The secondary ram bearing bypass channels 72 could be formed in other ways, such as grooves in either the secondary ram bearing 64 or in the inside wall of the secondary ram tip 62. The secondary ram bearing bypass channels 72 allow pressurized oil to flow out of the secondary cylinder cavity 70 and reduces or eliminates any pulsations caused by the pressurization of the secondary cylinder cavity 70. (See arrow 79 in FIG. 2A)

To lower the two-stage cylinder 20, foot pedal 101 is operated to a neutral or lower position to port pressurized oil in the inlet plenum 40 to the oil reservoir 30. Foot pedal 101 also shuts off air to the air control valve 120, which then ports air out of the oil reservoir 30 through air release 122 (See FIG. 4A) to the atmosphere. The weight of the first and second stage rams 62, 65 and any attached load forces oil out of the inlet plenum 40 and back into the oil reservoir 30. Initially, both the first and second stage cylinders 21, 22 lower together. As the first stage cylinder 21 approaches full retraction, a stem 49, extending from check valve 46 and below primary ram bearing 34, contacts a bottom surface in inlet plenum 40. Continued lowering of the primary ram bearing 34 (until the lower surface of the primary ram bearing 34 contacts bumper 50) pushes the valve stem 49 upward relative to the primary ram bearing 34 and opens valve 46 permitting pressurized oil to flow from the primary ram oil cavity 38 through the primary ram bearing 34 and the inlet plenum 40 into the oil reservoir 30. With the flow of oil out of the primary ram oil cavity 38, the second stage cylinder 22 begins to lower until the secondary cylinder nut 66 contacts the primary cylinder nut 36.

While the primary and secondary cylinders 21, 22 are lowered, the cylinder cavity bleed or bypass channels 72, 73 allow oil to flow back into the primary and secondary cylinder cavities 44, 70 keeping the cavities filled with oil. Keeping cavities 44, 70 filled with oil while lowering the cylinders 21, 22 prevents air from bleeding past any seals or O-rings into cavities 44, 70.

Figure 4A:
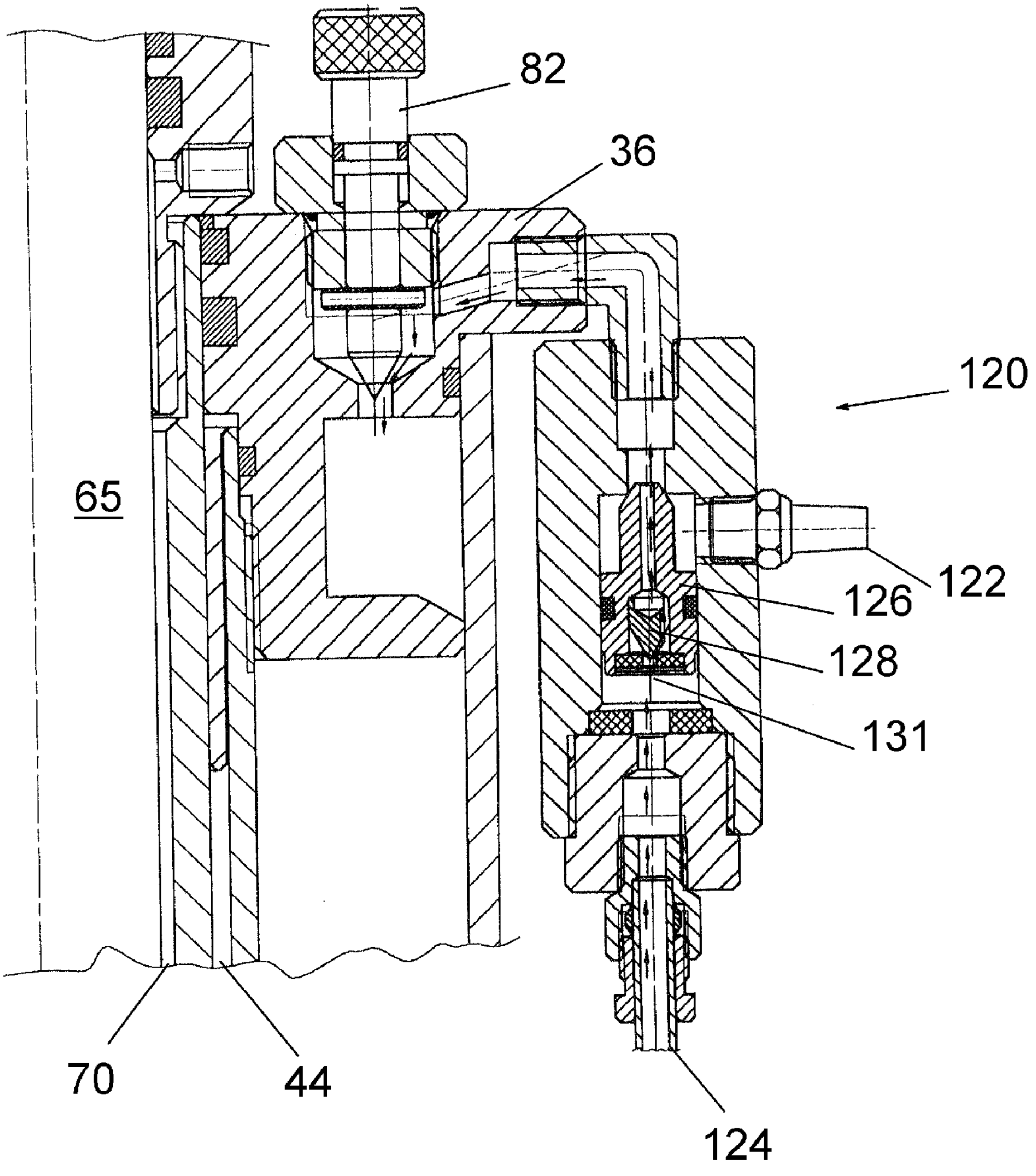
FIG. 4A is an enlarged cross-sectional view of an air control valve illustrating the raising operation.
Figure 4B:
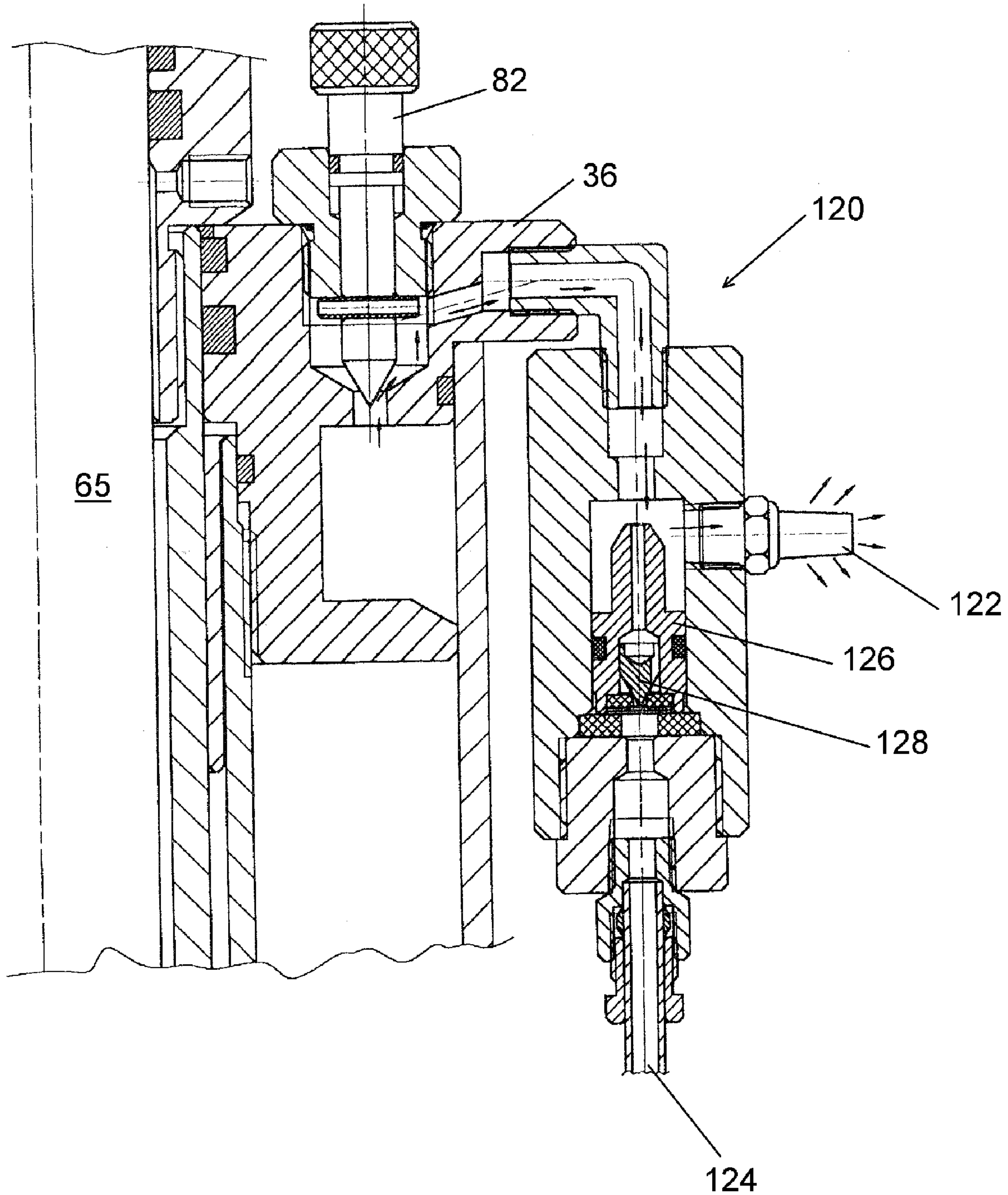
FIG. 4B is an enlarged cross-sectional view of the air control valve illustrating the lowering operation.
Figure 5:
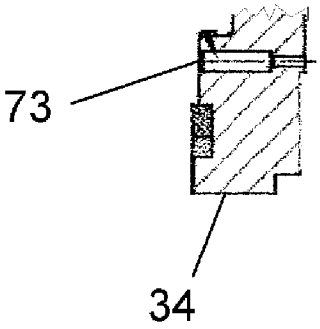
FIG. 5 is an enlarged cross-sectional view of a portion of the primary ram bearing.

FIGS. 4A and 4B show the air control valve 120 in both the raising configuration and the lowering configuration, respectively. A movable outer check valve 126 is captured within the air control valve 120. A second, movable inner check valve 128 is captured within the outer check valve 126. When compressed air is supplied via pump 25 to air inlet 124, as shown in FIG. 4A, the outer check valve 126 is moved upwards closing off the air release or exhaust 122. Inner check valve 128 is also moved upwards away from valve seat 131. The upwards movement of both check valves 126, 128 permits air to flow from the pump 25 through a pressure control valve 82 and into the oil reservoir 30 to pressurize the suction oil to the pump 25.

When foot pedal 101 is moved to the neutral or lower position, the air to the air control valve 120 is cut-off. Air pressure in the oil reservoir 30 will move both the outer check valve 126 and the inner check valve 128 to a lower position, shown in FIG. 4B. The inner check valve 128 seals off valve seat 131. The air pressure in the oil reservoir 30 is ported to air release 122 and the pressure in the oil reservoir 30 is released to the atmosphere. If needed, springs can be provided to bias the check valve 126, 128 to the lower or release position.

Figure 8:
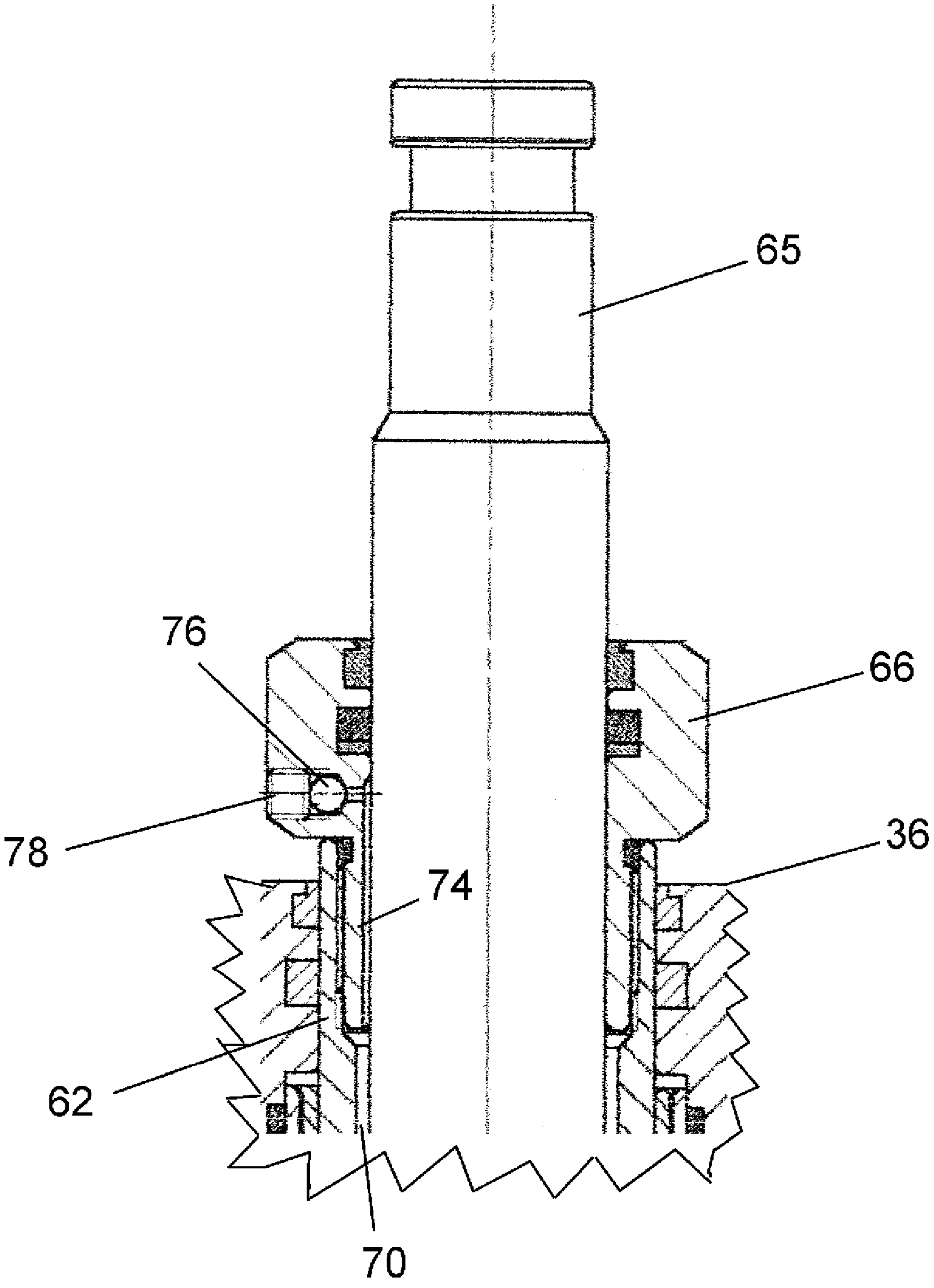
FIG. 8 is an enlarged cross-sectional view showing an air bleed passage in the secondary cylinder nut.

FIG. 8 shows circuitry that corrects the air trap problems. Most telescopic jack designs include pressure seals in the primary and secondary cylinder nuts. In this way, the cylinders and rams can be self lubricating in front and back of the ram bearings. This self lubricating feature is advantageous in telescopic ram designs that are exposed to side or off-balanced loads. A second method of sealing telescopic rams is to include the pressure seals on the ram bearings. The second method does not allow for any lubrication in front of the ram bearings. Both designs include primary and secondary cylinder cavities that are forward of or above their respective ram bearings. As the rams travel up to their respective cylinders, the air and oil (the first design) or air (the second design) in the cylinder cavities must be displaced somewhere else. Since the first design traps air in the oil system, a bleeder set screw and check ball were incorporated in the secondary cylinder nut allowing air to be bled out of the system similar to that of bleeding air out of an automobile brake line. Different jack manufacturers have different procedures for purging systems. Generally, these procedures do not necessarily remedy the air trap problem on the first attempt. Sometimes the procedure is repeated several times. In the second design, the air may escape the wiper rings in the cylinder nuts. The procedures take so long that they are not often done during the manufacturing process. The manufacturer realizes the air will eventually be trapped in the system again because freight and handling necessitate the jack being positioned on its side instead of upright. The end user is usually left with the air bleeding/purging procedure.

A second issue with telescopic rams is that the primary ram is expected to rise first to maximum extension and then the secondary ram. Hydraulic oil flow takes the path of least resistance. If the compression of the seal on the primary cylinder nut against the primary ram exceeds the compression of the seal on the secondary cylinder nut against the secondary ram, the secondary ram will rise first. Users associate this action with defective operation. Sometimes this will occur as a result of an air trapped system. In conditions like this, the secondary ram comes up to the load but will not lift or support the load. At this time, the primary ram comes up to and lifts the load to its maximum extension and then the secondary ram takes over. The problems of air trapped hydraulic systems and ram stages raising out of sequence are typical of these jacks no matter what kind of pump is used.

The new improved oil circuitry for telescopic rams permits the manufacturer to purge air from the system one time after assembly and not burden the user with the procedure no matter what shipping and handling conditions the jack is exposed to. Secondly, the improved oil circuitry eliminates the pulsating effect on the rams. Thirdly, the primary and secondary rams raise together proportionally to their respective cylinder diameter areas and will raise a load at any point in the lifting procedure.

A small primary ram bearing bleed channel 73 is provided in the primary ram bearing 34 to permit flow of oil and any air from the primary cylinder cavity 44 into the primary ram bearing bore 45. As the primary ram bearing 34 is raised, the oil and any air in the primary cylinder cavity 44 will be squeezed out of the primary cylinder cavity 44 and into the primary ram oil cavity 38. This flow of oil into the primary ram oil cavity 38 increases the pressure in the cavity 38 and causes the secondary ram bearing 64 to rise relative to the primary ram bearing 34.

Secondary ram bearing bypass channels 72, between the secondary ram bearing 64 and the secondary cylinder 62, permit any air to flow from the primary ram oil cavity 38 into the secondary cylinder cavity 70, between the secondary ram 65 and the primary ram 62. The secondary ram bearing bypass channels 72 also permit oil to flow out of the secondary cylinder cavity 70, when the second stage cylinder 20 is being raised. The secondary ram bearing bypass channels 72 can be formed completely within the secondary ram bearing 64, the secondary cylinder 62 or at the adjoining surfaces of the ram bearing 64 and cylinder 62.

As shown in FIG. 8, an air bleed channel 74 is formed in the secondary cylinder nut 66 extending from the upper end of the secondary cylinder cavity 70 to the exterior of the secondary cylinder nut 66. A check ball 76 and bleeder set screw 78 are provided in the upper end of the air bleed channel 74 to bleed air from jack 10 when necessary and to seal the air bleed channel 74.

The following steps illustrate how air is bled from the jack 10:

Pressurized oil from the pump 25 enters the primary cylinder 21. The primary ram 62 starts to rise as there is an O-ring pressure seal on the primary ram bearing 34.

Any air in the primary cylinder cavity 44 enters the secondary cylinder cavity 70 via primary ram bearing bleed channel 73 and secondary ram bearing bypass channels 72.

The primary ram 62 continues to rise until the top of the primary ram bearing 34 makes contact with the primary stop 42. When the primary ram 62 is prevented from further travel, the oil pressure dislodges the valve 46 from its seat in the primary ram bearing 34 and pressurized oil and any air enters the secondary cylinder cavity 70 via the primary ram oil cavity 38 and the secondary ram bearing bypass channels 72.

The air and oil in the primary ram oil cavity 38 also travel up the small channel 72 in the secondary ram bearing 64, into the secondary cylinder cavity 70, through another small channel 74 in the secondary cylinder nut 66, and up against the check ball 76 and the bleeder set screw 78.

When the jack 10 is pumped to maximum extension, an Allen wrench is inserted in the bleeder set screw 78. Turning the bleeder set screw 78 slightly in a counterclockwise direction and slowly pumping the jack 10 will bleed the air out of the jack 10. The air is bled out until only oil escapes from the bleeder set screw 78. The bleeder set screw is tightened to seal the jack 10.

When the load is released and the rams retract all the way down to their collapsed positions, only oil will fill both the primary and secondary cylinder cavities.

Bleeding the air from the jack 10 only needs to be performed one time by the manufacturer. Air cannot enter the jack 10 again unless the pump 25 pumps oil containing air. In most cases, the pump 25 is hooked directly to the two-stage cylinder 20 and the air purging procedure takes care of both the pump 25 and first and second stage cylinders 21, 22. A properly configured air-over-hydraulic foot pump 25 and the improved oil circuitry for telescopic rams makes for a better alternative to the current design of air and hydraulics for dual stage telescopic transmissions jacks.

In a broad aspect, the present invention is the combination of a multi-stage telescopic jack in combination with an air-over oil pump. In a further aspect, the present invention provides pressurized oil to the suction of the air-over-oil pump by porting air through the air-over-oil pump to the oil reservoir in the multi-stage jack. The air pressure is relieved through an air control valve when lowering the jack. The present invention also addresses the problem of pulsations of the jack by bypassing oil from the primary oil cavity through the primary ram bearing and by bypassing oil from the secondary oil cavity through the secondary ram bearing. Preferably, oil from the primary oil cavity is bypassed to the upper side of the primary ram bearing. An air bleed channel is provided in the secondary cylinder nut to port any air from the secondary oil cavity to the atmosphere through an air bleed screw. The present invention also includes a method for bleeding air from the multi-stage telescopic jack through the air bleed screw.

What is claimed is:

1. In combination:

a multi-stage telescoping transmission jack; and an air-over-oil piston pump supplying pressurized hydraulic fluid to the multi-stage telescoping transmission jack.

2. The combination according to claim 1, wherein the air-over-oil piston pump supplies pressurized hydraulic fluid at no more than about 3,500 p.s.i..

3. The combination according to claim 1, wherein the multi-stage telescoping transmission jack has an oil cavity between each stage; and means for bleeding hydraulic fluid from at least one oil cavity.

4. The combination according to claim 3, wherein each stage of the multi-stage telescoping transmission jack has an outer cylinder and an inner linearly movable ram, the oil cavity between each stage being formed between the outer cylinder and the inner linearly movable ram; and the means for bleeding comprising a passage through the inner linearly movable ram, the passage being in fluid communication with the oil cavity.

5. The combination according to claim 1, wherein the multi-stage telescoping transmission jack has a hydraulic fluid reservoir containing a quantity of hydraulic fluid; and an air control valve, the air control valve having a first position and a second position, the air control valve porting compressed air to the hydraulic fluid reservoir when in the first position; and, the air control valve venting compressed air from the hydraulic fluid reservoir when in the second position.

6. The combination according to claim 1, wherein the multi-stage telescoping transmission jack has a hydraulic fluid reservoir containing a quantity of hydraulic fluid; and a source of compressed air in fluid communication with the hydraulic fluid reservoir.

7. The combination according to claim 1, wherein the multi-stage telescoping transmission jack has a controllably pressurizable hydraulic fluid reservoir containing a quantity of hydraulic fluid.

8. A multi-stage telescoping transmission jack comprising:

a primary cylinder;

a linearly movable primary ram within the primary cylinder, a least a portion of the primary ram being a hollow cylinder, the primary ram having a primary ram bearing within a lower end of the hollow cylindrical portion thereof;

a primary oil cavity between the primary cylinder and the primary ram;

a linearly movable secondary ram within the primary ram;

a secondary oil cavity formed between the secondary ram and the primary ram; and means for bleeding oil from at least one of the primary oil cavity and the secondary oil cavity.

9. The multi-stage telescoping transmission jack according to claim 8, wherein the means for bleeding oil comprises a bleed passage through at least one of the primary ram and the secondary ram.

10. The multi-stage telescoping transmission jack according to claim 9, wherein the means for bleeding oil comprises a bleed passage through the secondary ram to an undersurface of the secondary ram.

11. The multi-stage telescoping transmission jack according to claim 9, wherein the means for bleeding oil comprises a bleed passage through the primary ram to an undersurface of the secondary ram.

12. The multi-stage telescoping transmission jack according to claim 8, further comprising:

an oil reservoir; and an air control valve, the air control valve having a first position and a second position, the air control valve porting compressed air to the oil reservoir when in the first position; and, the air control valve venting compressed air from the oil reservoir when in the second position.

13. In combination:

the multi-stage telescoping transmission jack according to claim 8; and an air-over-oil piston pump.

14. A multi-stage telescoping transmission lack comprising:

a primary cylinder;

a linearly movable primary ram within the primary cylinder, a least a portion of the primary ram being a hollow cylinder;

a primary oil cavity between the primary cylinder and the primary ram;

a linearly movable secondary ram within the primary ram;

a secondary oil cavity formed between the secondary ram and the primary ram; and means for bleeding oil from at least one of the primary oil cavity and the secondary oil cavity, wherein the primary ram has a primary ram bearing at a lower end of the hollow cylindrical portion thereof, the primary ram bearing having an interior through passage, the means for bleeding oil comprising a bleed passage through the primary ram to an undersurface of the secondary ram, bleed passage extending through the primary ram bearing to the interior through passage.

15. The multi-stage telescoping transmission jack according to claim 14, wherein a lower tip portion of the secondary ram extends into the primary ram bearing interior through passage when the secondary ram is in a lowered position, there being an oil passage between the secondary ram lower tip portion and the primary ram bearing interior through passage.

16. The multi-stage telescoping transmission jack according to claim 15, wherein the tip portion of the secondary ram has a hexagonal shape and the primary ram bearing interior through passage has a cylindrical shape, the oil passage between the secondary ram lower tip portion and the primary ram bearing interior through passage being formed by gaps between the secondary ram tip portion flat surfaces and the primary ram bearing interior through passage cylindrical surface.

17. A multi-stage telescoping transmission jack comprising:

a primary cylinder;

a linearly movable primary ram within the primary cylinder, a least a portion of the primary ram being a hollow cylinder;

a primary oil cavity between the primary cylinder and the primary ram;

linearly movable secondary ram within the primary ram;

a secondary oil cavity formed between the secondary ram and the primary ram;

means for bleeding from at least one of the primary oil cavity and the secondary oil cavity;

an oil reservoir; and an air control valve, the air control valve having a first position and a second position, the air control valve porting compressed air to the oil reservoir when in the first position; and, the air control valve venting comp essed air from the oil reservoir when in the second position, the air control valve having;

a hollow body having three air ports therein, an inlet port, an exhaust port and an oil reservoir port;

a linearly movable first valve within the hollow body, the first valve being movable between a first position and a second position, and having first and second interior air ports therein; and a linearly movable second valve within the first valve, the second valve being movable between a first position and a second position.

18. The multi-stage telescoping transmission jack according to claim 17, wherein when the air control valve is in the first position, the first valve is in the first valve first position and the second valve is in the second valve first position, the first valve unblocking the inlet port and blocking the exhaust port, the second valve unblocking the first valve first interior air port.

19. The multi-stage telescoping transmission jack according to claim 17, wherein when the air control valve is in the second position, the first valve is in the first valve second position and the second valve is in the second valve second position, the first valve blocking the inlet port and unblocking the exhaust port, the second valve blocking the first valve first interior air port.

20. A multi-stage telescoping transmission jack comprising:

a primary cylinder;

a linearly movable primary ram within the primary cylinder, a least a portion of the primary ram being a hollow cylinder, the primary ram having a primary ram bearing at a lower end thereof, the primary ram bearing having an interior through passage;

a primary oil cavity between the primary cylinder and the primary ram, the primary ram bearing having a bleed passage extending between the primary oil cavity and the primary ram bearing interior through passage;

a linearly movable secondary ram within the primary ram, a lower tip portion of the secondary ram extending into the primary ram bearing interior through passage when the secondary ram is in a lowered position, there being an oil passage between the secondary ram lower tip portion and the primary ram bearing interior through passage; and a secondary oil cavity formed between the secondary ram and the primary ram, there being a bleed passage through the secondary ram to an undersurface of the secondary ram.

21. The multi-stage telescoping transmission jack according to claim 20, further comprising:

an oil reservoir; and an air control valve, the air control valve having a first position and a second position, the air control valve porting compressed air to the oil reservoir when in the first position; and, the air control valve venting compressed air from the oil reservoir when in the second position.

22. The multi-stage telescoping transmission jack according to claim 20, wherein the tip portion of the secondary ram has a hexagonal shape and the primary ram bearing interior through passage has a cylindrical shape, the oil passage between the secondary ram lower tip portion and the primary ram bearing interior through passage being formed by gaps between the secondary ram tip portion flat surfaces and the primary ram bearing interior through passage cylindrical surface.

23. A method for lifting a transmission comprising:

providing a multi-stage transmission jack having a primary cylinder; a linearly movable primary ram within the primary cylinder; a primary oil cavity between the primary cylinder and the primary ram; a linearly movable secondary ram within the primary ram; a secondary oil cavity formed between the secondary ram and the primary ram; and, a hydraulic fluid reservoir containing a quantity of hydraulic fluid;

supplying the hydraulic fluid to a pump;

operating the pump to increase the pressure of the hydraulic fluid to an operating pressure;

supplying the operating pressure hydraulic fluid to the underside of the primary cylinder;

porting hydraulic fluid from the primary cylinder cavity to an underside of the secondary ram; and porting hydraulic fluid from the secondary cylinder cavity to the underside of the secondary ram.

24. The method according to claim 23, wherein in the step of operating the pump comprises:

providing an air-over-oil piston pump; and providing compressed air to the air-over-oil piston pump.

25. The method according to claim 24, wherein the step of supplying hydraulic fluid further comprises:

pressurizing the hydraulic fluid in the hydraulic fluid reservoir.

26. A method for lifting a transmission comprising:

providing a multi-stage transmission jack having a primary cylinder; a linearly movable primary ram within the primary cylinder; a primary oil cavity between the primary cylinder and the primary ram; a linearly movable secondary ram within the primary ram; a secondary oil cavity formed between the secondary ram and the primary ram; and, a hydraulic fluid reservoir containing a quantity of hydraulic fluid;

providing an air-over-oil pump;

providing compressed air to the air-over-oil pump;

pressurizing the hydraulic fluid in the hydraulic fluid reservoir;

supplying the pressurized hydraulic fluid to the pump;

operating the air-over-oil pump to increase the pressure of the hydraulic fluid to an operating pressure;

supplying the operating pressure hydraulic fluid to the underside of the primary cylinder;

porting hydraulic fluid from the primary cylinder cavity to an underside of the secondary ram; and porting hydraulic fluid from the secondary cylinder cavity to the underside of the secondary ram, wherein the step of pressurizing hydraulic fluid in the hydraulic fluid reservoir comprises providing compressed air to the hydraulic fluid reservoir while simultaneously providing compressed air to the air-over-oil pump.

27. A method for bleeding air from a multi-stage transmission jack, the method comprising the steps of:

providing a multi-stage transmission jack having a primary cylinder; a linearly movable primary ram within the primary cylinder; a primary oil cavity between the primary cylinder and the primary ram; a linearly movable secondary ram within the primary ram; and, a secondary oil cavity formed between the secondary ram and the primary ram;

supplying pressurized hydraulic fluid to an underside of the primary ram;

porting any air contained within the primary oil cavity to an underside of the secondary ram;

supplying pressurized hydraulic fluid to the underside of the secondary ram;

porting any air contained beneath the underside of the secondary ram to the secondary oil cavity;

continuing to supply pressurized hydraulic fluid to the underside of the primary ram and the underside of the secondary ram until the primary ram and the secondary ram have moved to an upper limit of travel; and while continuing to supply pressurized hydraulic fluid to the underside of the primary ram and the underside of the secondary ram, bleeding any air contained within the secondary oil cavity.

* * * * *